Jan. 27, 1942.   J. M. STRANG ET AL   2,271,380
EYEPIECE OF OPTICAL INSTRUMENTS
Filed March 16, 1940
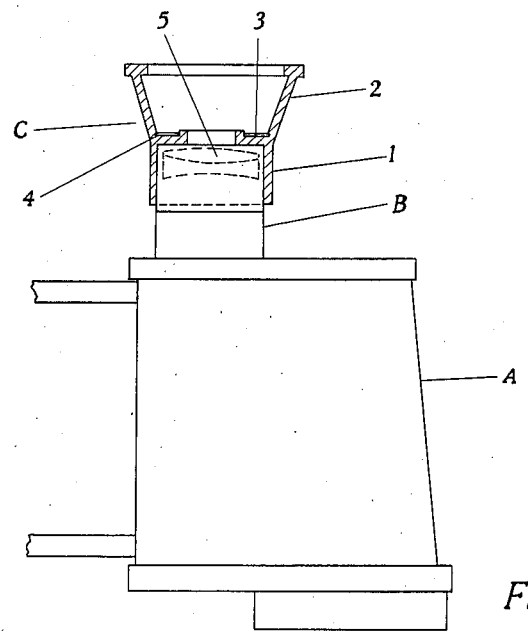
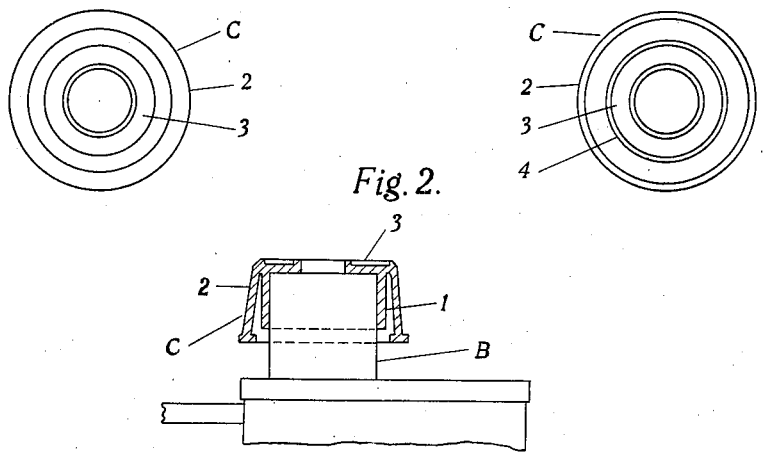
John Martin Strang
Claud Forter
Inventors
Lancaster, Allwine & Rommel
Attorneys Patented Jan. 27, 1942

2,271,380

UNITED STATES PATENT OFFICE 2,271,380

EYEPIECE OF OPTICAL INSTRUMENTS

John Martin Strang and Claud Foster, Anniesland, Glasgow, Scotland, assignor to Barr and Stroud, Limited, Anniesland, Glasgow, Scotland Application March 16, 1940, Serial No. 324,432
In Great Britain March 22, 1939

2 Claims. (Cl. 88—1)

This invention refers to eyepieces of optical instruments, for example, binocular or monocular telecope instruments.

For convenience of use by an observer with or without spectacles or with or without a gas-mask, eyepieces have been proposed having an eyecap which is movable axially as a whole so that it can be placed and held in more than one position relative to the eye lens. The present invention is concerned with the provision of means for the same purpose as the foregoing, but materially simplified in construction and operation.

According to this invention there is provided an eyecap made in the form of a tubular member composed of rubber or like flexible material designed to occupy a first or normal position with the tubular member in extended condition and a second position with the part of the eyecap normaly next the eye folded over upon the part farther away from the eye, thus reducing the axial length of the eyecap.

In the first condition, the instrument is suitable for use by an observer without spectacles or gas-mask, the extended eyecap giving the eye the appropriate position relative to the eye lens, while in the second condition the instrument is suitable for use by an observer with spectacles or gas-mask, the folded eyecap in conjunction with the spectacles or gas-mask giving the eye the appropriate position relative to the eye lens.

In carrying the invention into practice, the eyecap may comprise an annular part, say a cylindrical part, adapted to grip the eyepiece tube of the instrument at the eye lens end thereof, and a diverging cup-shaped part extending from the cylindrical part, the first position being obtained with the eyecap extended and the second position with the cup-shaped part folded back over the cylindrical part. There may be an internal annular rib at the junction of these two parts to bear on the eye lens end of the eyepiece tube of the instrument and serving when the cup-shaped part is folded back to protect the glass of spectacles, gasmask or goggles from being scratched by rubbing against the metal of the eyepiece tube.

To facilitate folding and to give a definite line of fold, a groove may be formed in the wall of the eyecap on the line of folding.

The invention will now be described with reference to the accompanying drawing, in which:

Figure 1 shows one limb of a prismatic binocular instrument with the eyecap in its extended condition.

Figure 2 is a corresponding view showing the eyecap in its folded condition.

Figure 3 is a plan view of the eyecap in its extended condition, and

Figure 4 is a plan view of the eyecap in its folded condition.

Figures 1 and 2 show prism casing A, eyepiece tube B and eyecap C.

The eyecap is made of rubber and comprises a cylindrical part 1, a conical cup 2, and an internal annular rib 3. The wall of the eyecap is grooved at 4, to assist folding.

For use, the eyecap is applied to the eyepiece tube B of the instrument, the part 1 gripping the tube and the rib 3 bearing on the end of the tube. The cup 2 normally extends beyond the end of the tube B, the eye lens being indicated at 5 in dotted lines. The second position is obtained as shown in Figure 2 by folding the cup 2 of the eyecap C back upon the cylindrical part 1, the rib 3 being then exposed and forming a protective cover as previously referred to.

We claim:

1. An eyecap for optical instruments having an eyepiece tube, said eyecap in the form of a tubular member composed of flexible elastic material, such as rubber, and comprising a cylindrical part for gripping the eyepiece tube, a diverging cup-shaped part co-terminous with said cylindrical part, and an internal annular rib at the junction of the said two parts bearing on the end of the eyepiece tube, the cup-shaped part being foldable on the plane of the annular rib back upon the outside of the cylindrical part, to provide two eyepiece conditions, one with the eyecap extended and projecting beyond the eyepiece tube and the other with the eyecap folded.

2. An eyecap for optical instruments having an eyepiece tube, said eyecap in the form of a tubular member composed of flexible elastic material, such as rubber, and comprising a cylindrical part for gripping the eyepiece tube, a diverging cup-shaped part co-terminous with said cylindrical part, and an internal annular rib at the junction of the said two parts bearing on the end of the eyepiece tube, the cup-shaped part being foldable on the plane of the annular rib back upon the outside of the cylindrical part, to provide two eyepiece conditions, one with the eyecap extended and projecting beyond the eyepiece tube and the other with the eyecap folded, there being a groove formed in the wall of the eyecap on the line of folding, to assist folding.

J. MARTIN STRANG.
CLAUD FOSTER.